United States Patent
Havas et al.

[15] 3,686,558
[45] Aug. 22, 1972

[54] CONTROL FOR FREQUENCY CONVERTERS

[72] Inventors: George Havas, Youngstown, Ohio; Shashi Bhushan Dewan, Toronto, Canada

[73] Assignee: Ajax Magnethermic Corporation, Warren, Ohio

[22] Filed: Jan. 4, 1971

[21] Appl. No.: 103,569

[52] U.S. Cl. .......................... 321/7, 321/11, 321/19, 321/40, 321/52, 321/69 R
[51] Int. Cl. .............................................. H02m 5/30
[58] Field of Search .......... 321/3, 4, 7, 11, 19, 40, 52, 321/58, 60, 61, 69

[56] References Cited

UNITED STATES PATENTS

| | | | |
|---|---|---|---|
| 3,568,033 | 3/1971 | Gyugyi | 321/7 |
| 3,517,300 | 6/1970 | McMurray | 321/69 R |
| 3,424,970 | 1/1969 | Ross | 321/18 X |
| 3,376,487 | 4/1968 | Bixby | 321/19 X |
| 3,461,374 | 8/1969 | Rhyne, Jr. | 321/19 X |
| 3,566,245 | 2/1971 | Blokker et al. | 321/19 X |

*Primary Examiner*—William M. Shoop, Jr.
*Attorney*—J. H. Slough

[57] ABSTRACT

Control means for an AC/AC frequency converter for induction heating employing solid state switching devices of the type shown in application for U.S. Letters Patent Ser. No. 737,639 filed June 17, 1968, (U.S. Pat. No. 3,546,562, granted Dec. 8, 1970), which operates essentially at the resonant frequency of the tuned load circuit, comprising circuits individually sensing the high frequency output voltage and current, the low frequency input voltage and combining said individual signals to automatically adjust firing signals delivered to the solid state switching devices to minimize transients.

24 Claims, 13 Drawing Figures

Patented Aug. 22, 1972

INVENTORS
GEORGE HAVAS
SHASHI BHUSHAN DEWAN
BY
J. H. SLOUGH
ATTORNEY

CONTROL FOR FREQUENCY CONVERTERS

In the control means of our invention for a frequency converter of the type referred to herein, converting three-phase alternating current power into single-phase higher variable frequency alternating current power that is particularly adapted for use in induction heating and melting, which converters operate essentially at the resonant frequency of a tuned load circuit, comprising circuit individually sensing the high frequency output voltage and current, the low frequency input voltage and in which individual signals are combined to control firing of solid state switching devices, a fixed interval between the pulses which cause the solid state switching devices to become conductive and the time at which the output voltage reaches the zero cross-over instant is maintained when the converter is operating under normal steady state conditions. Under various transient conditions, however, such as the initiation of the operation of the converter, sudden load changes, changes in the intended power level, line voltage surges, etc., the pattern of instantaneous output voltage and current will depart substantially for a period of a few half-cycles from the normal stead state operating pattern. If the fixed time relationship described above is maintained during these transient periods, the free running oscillation of the circuit may be disturbed, the operation may be interrupted non-destructively, or the solid state switching devices may even be destroyed. The improved control means of our invention prevents such disturbance or interruption of the circuit or damage to the switches.

An object of this invention is to provide improved control means for a converter of the type set forth. It is also an object of this invention to provide improved control means in a converter of the type referred to to accommodate the transient changes by an automatic adjustment in the timing of the firing pulses.

It is a further object of this invention to provide control means whereby initiation of the operation of the converter is achieved with a minimum of deleterious transient effect.

A still further object of the invention is to provide an improved method for power control in a converter of the type referred to whereby transients are minimized.

Another object of the invention is to provide improved control means for a converter of the type referred to whereby damage to the solid state switching devices is avoided.

A still further object of the invention is to provide improved control means for a converter of the type referred to whereby continued and smooth safe operation of the converter is achieved.

Another object of the invention is to achieve a converter of the type referred to with improved operating characteristics and efficiency.

Other objects of our invention and the invention itself will become more readily apparent by reference to the accompanying drawings and appended specification, in which drawings, like parts are designated by like reference characters.

Figure 8:
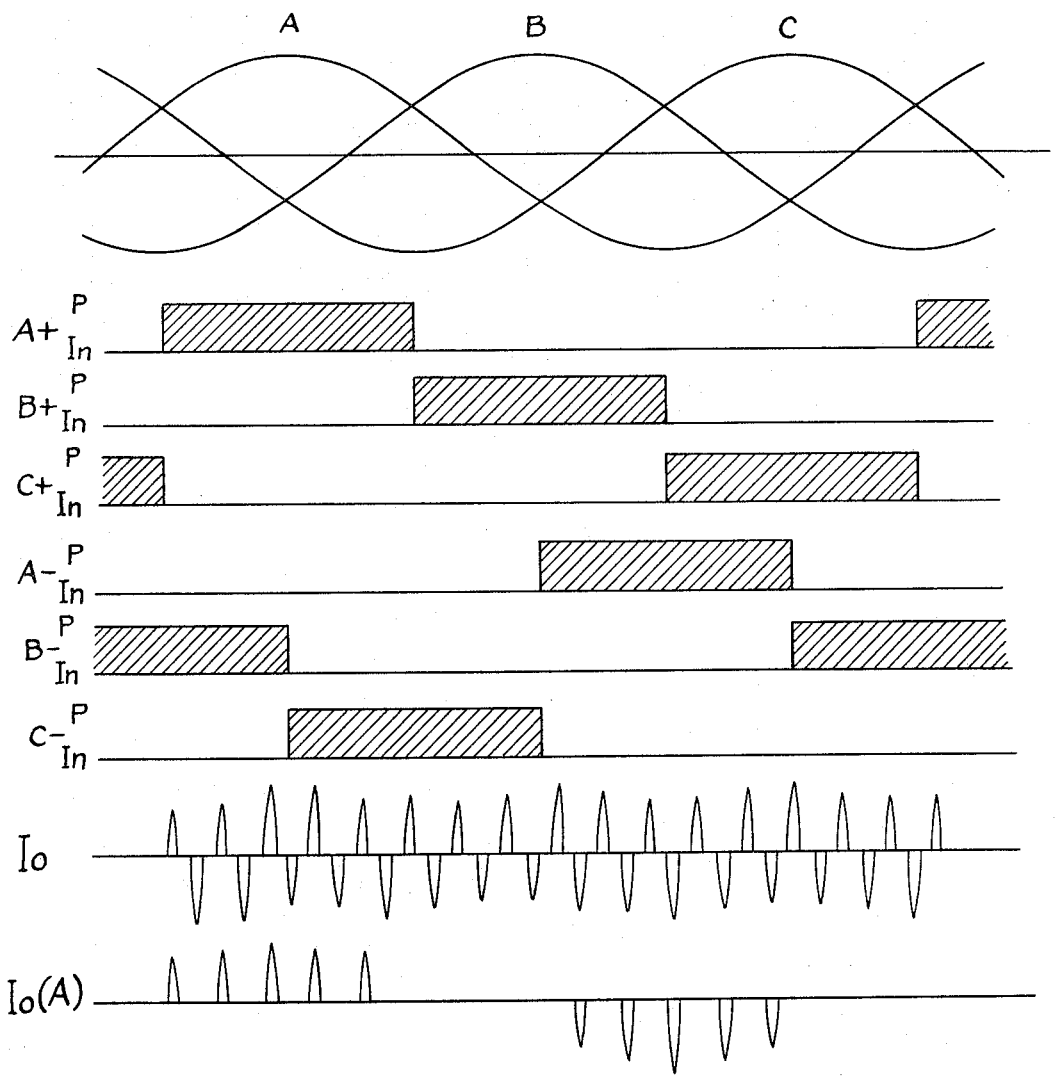
Figure 9:
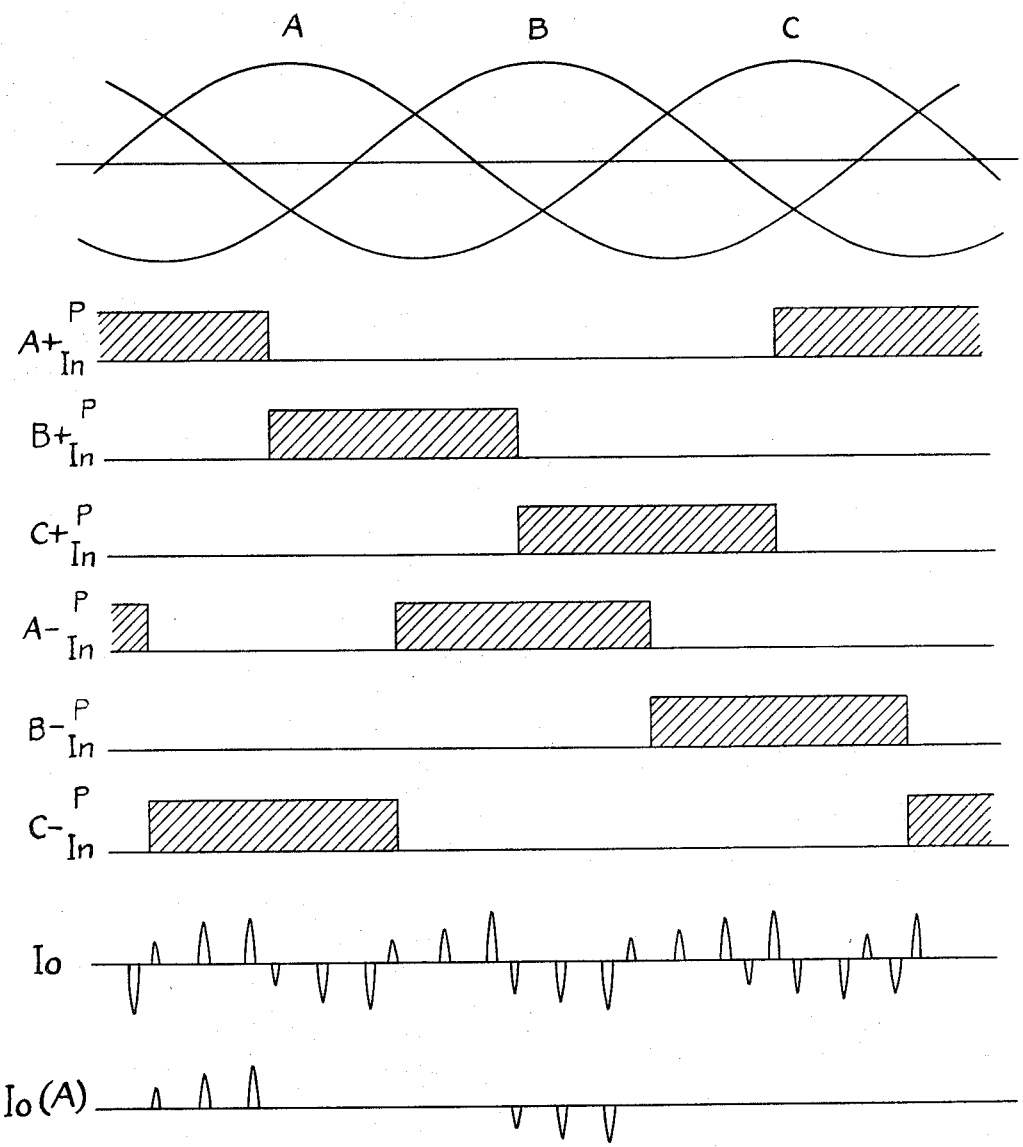

FIG. 8 is a diagrammatic sketch showing the time relationship between the line to neutral input voltage, the envelope, the total output current, and the current through a selected pair of thyristors 10 and 11 for maximum output voltage; and FIG. 9 is a diagrammatic sketch showing the time relationship between the line to neutral input voltage, the envelope, the output current, and the current through the selected pair of thyristors for minimum output voltage.

Figure 1:
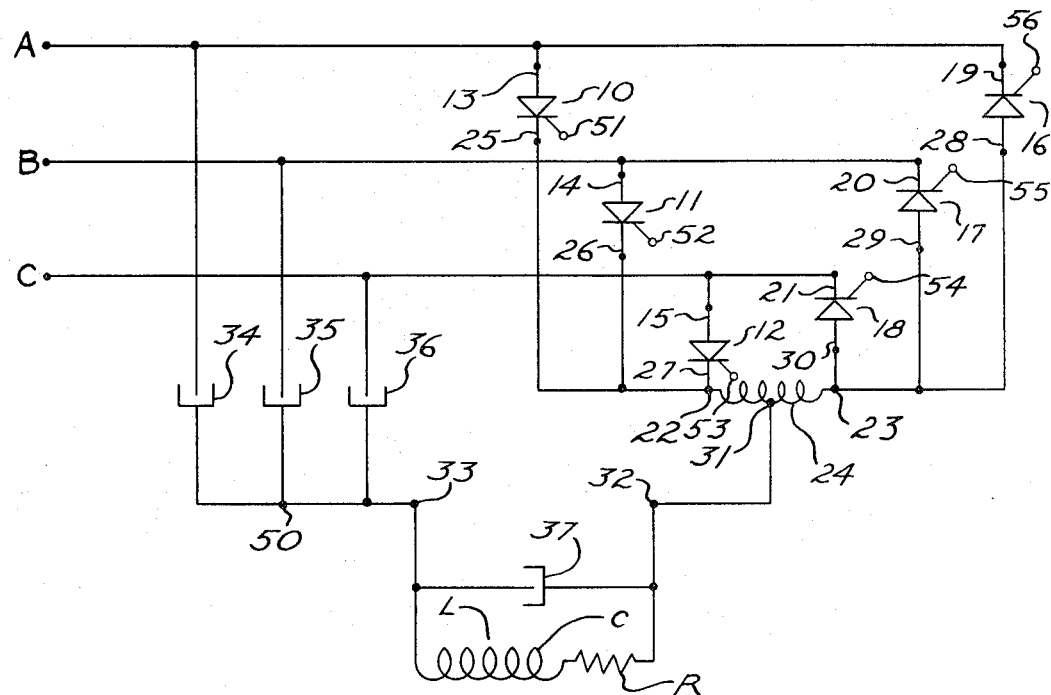
FIG. 1 shows a frequency converter circuit connected between a three-phase low frequency source of alternating current and a single phase high frequency load.

In FIG. 1 a converter of the type described, set forth and claimed in co-pending application filed June 17, 1968, for Frequency Converter, Ser. No. 737,639 (U.S. Pat. No. 3,546,562, granted Dec. 8, 1970) of the present inventors, is illustrated. In such converter, anodes 13, 14, 15 of switches 10, 11, 12 are connected each to a phase of the source A, B, and C and can be termed "positive" conducting switches. The remaining three switches 16, 17, 18 have their cathodes 19, 20, 21 connected to the said three phases of the source and are termed "negative" conducting switches. The cathodes 25, 26, 27 of the positive switches 10, 11, 12 each having a common connection and are connected to an end terminal 22 of a center tapped inductance winding 24. The anodes 28, 29, 30 of the negative switches 16, 17, 18 have a common connection and are connected to an end terminal 23 of the inductance winding 24. The center tapped terminal 31 of the inductance winding 24 is connected to a high frequency terminal 32 of the load. The converter also includes three capacitors 34, 35, 36 connected in wye, with one terminal connected to each of the phases of the source A, B, and C and a second terminal of each connected to a common point 50 connected to a second high frequency output terminal 33 of the load.

Figure 1A:
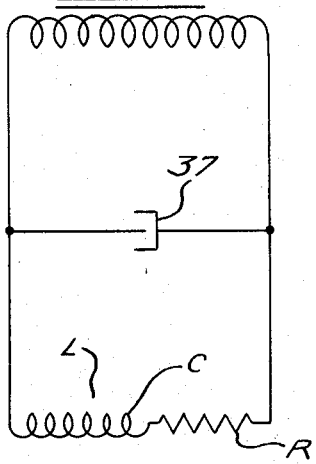
FIG. 1a is an alternate method of load connection employing an isolation transformer.
Figure 2:
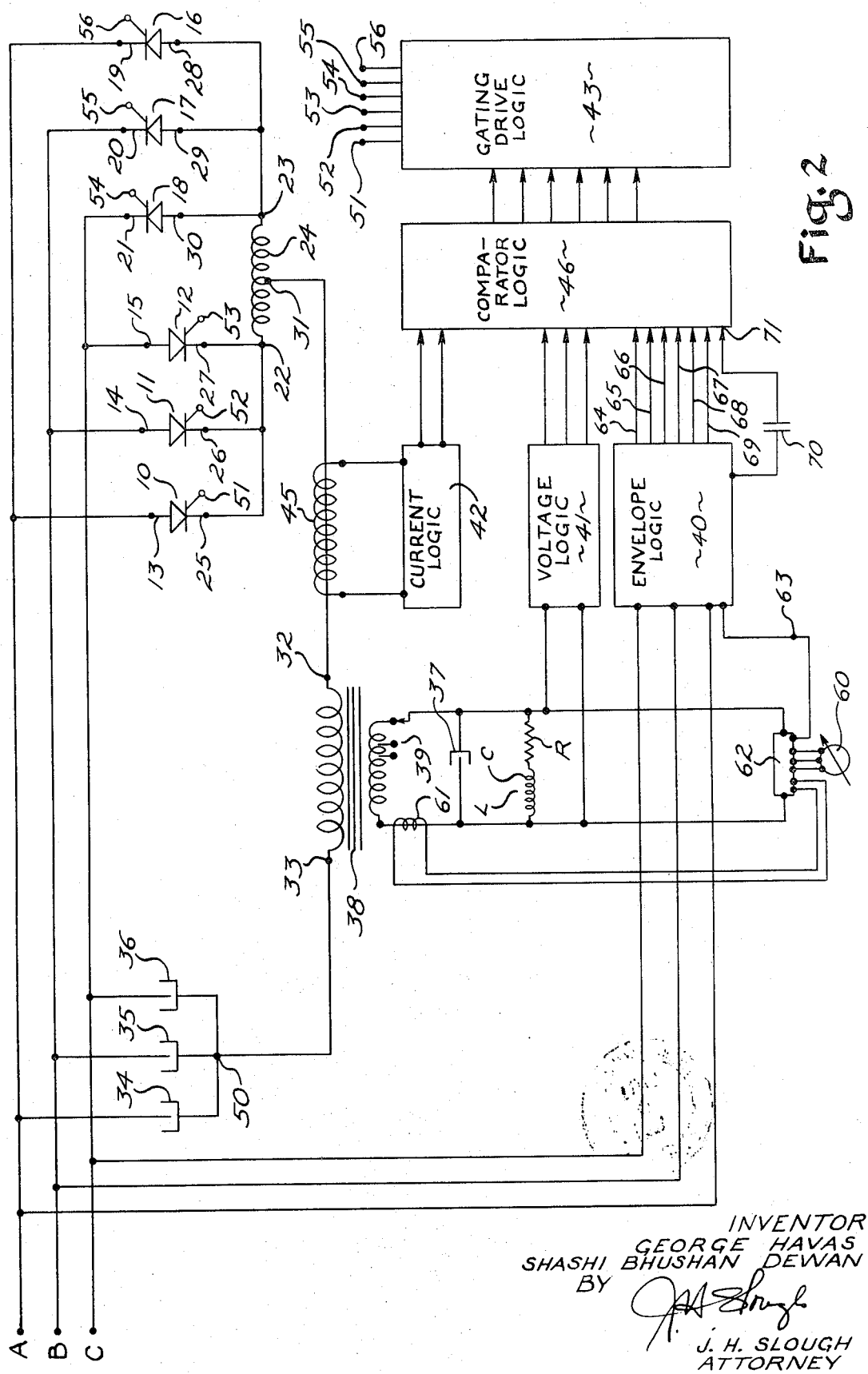
FIG. 2 shows the frequency converter circuit of FIG. 1 with the thyristor control system of our invention applied thereto.

The load connected to the output terminals 32, 33 is designated by "L" and is represented by an inductance coil "C" and resistance "R" in series therewith connected in parallel with capacitance 37 which tunes the combination of the capacitance and the load to a higher value frequency than the polyphase lower frequency supplied. Alternatively, the load can be connected to the output terminals by means of an isolation transformer 38 as shown in FIGS. 1a and 2. In operation, in the circuit of FIG. 1, one of the positive switches 10, 11, 12 is caused to conduct and current to flow through the selected switch and then through a portion of the inductance 24, through the load, and then through the capacitance and back to the source. As the capacitances conduct the load current they are charged so that the voltage across said switch is first reduced to zero, then to a negative value, and current ceases to flow to the load.

One of the negative switches is then caused to conduct and current starts to flow in the series resonant circuit in an opposite direction from that described above, through the capacitance, through the load "L" and through the remaining portions of the inductance 24. Current continues to flow through said portion of the inductance until the capacitance is charged sufficiently to cause the voltage across the selected negative switch to be reduced to zero and then to a negative value and load current then ceases. It will thus be seen that the operation of the converter generally involves alternate operation of positive conducting switches and negative conducting switches and only one polarity is conducting at any time.

In the converter of our invention, as shown in FIG. 2 we have incorporated a control means in the circuit of FIG. 1 which consists of a so-called "envelope logic" 40 which derives signals from the voltage of the separate phases A, B, C; "voltage logic" 41 which derives signals from the output voltage across the load; "current logic" 42 which derives signals through a sensing means or current transformer 45 from the output current, each of the said signals being combined by a so-called "comparator" as indicated by box representation 46. The comparator's function is to accept the "permissive" (designed as P) or "inhibit" (designated as In) signal from the above-mentioned three logics and to deliver a proper signal to the "gating drive circuit" 43 to operate an appropriate gate 51–56 of the selected thyristor 10, 11, 12, 16, 17, or 18.

Maximum output power is realized when switch 10 connected to phase A is caused to conduct during the time period when A is the most positive of the input phases; when switch 11 connected to phase B is caused to conduct during the time period when B is the most positive, when switch 12 connected to phase C is caused to conduct during the period when phase C is most positive; and similarly when thyristors 16, 17 and 18 with their cathodes connected to phases A, B, and C, respectively, are caused to conduct during the time periods when the phases A, B, and C are most negative.

Figure 3:
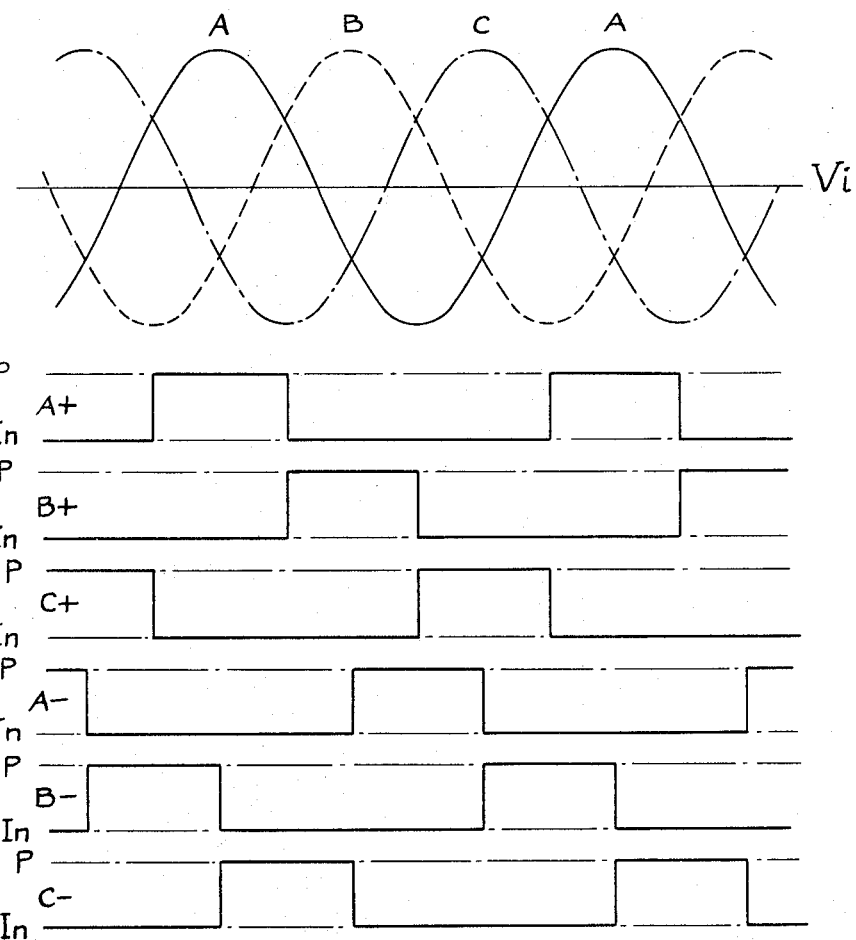
FIG. 3 illustrates the relationship between the three-phase line to neutral voltage input of the converter circuit and the state of the envelope logic at maximum power.

The time periods during which any one of the thyristors may conduct are termed "envelopes." The envelope portion of the control 40 takes as input information the instantaneous value of the input voltages of phases A, B, and C and the conditions for maximum power are shown in FIG. 3. In order that a balanced three-phase load be presented to the supply, it is essential that these "envelopes" be of substantially equal duration.

Power control can be achieved as for example by shifting the "envelope" with respect to the input voltage, as shown in FIG. 8 as hereinafter described.

Figure 4:
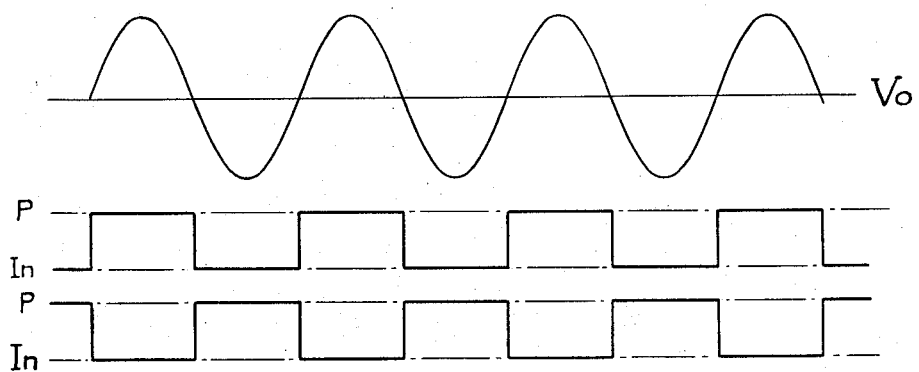
FIG. 4 illustrates the relationship between the high frequency circuit output voltage and the voltage logic of the control of the invention.

As shown in FIG. 4, a second portion of the control circuit 41 takes as its input information the instantaneous value of the output voltage across the load "L" and based on this information directs the firing pulses to the switches so that "positive" switches 10, 11, and 12 and negative switches 16, 17, 18 are supplied with firing pulses to sustain the oscillation in the tuned load circuit and respond to changes in the load resonant frequency. During normal steady state conditions of this converter, a fixed time interval is maintained between the voltage zero cross-over instant and the initiation of firing. This time interval may be positive or negative and is relatively small with respect to the period of the output voltage.

The switches utilized in this equipment are of the type that require a definite time to change from their blocking or non-conducting state to their conducting state; and then after cessation of current a definite but different period of time to regain their blocking ability.

Figure 5:
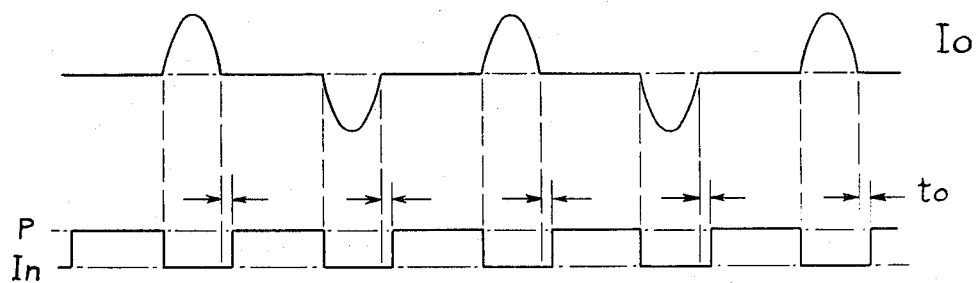
FIG. 5 illustrates the relationship between output current and the current logic of the control of the invention.

The current logic portion of the control 42 takes as its input a signal which is proportional to the output current $I_o$ from the current transformer 45 and permits the delivery of an output pulse based on the voltage zero cross-over instant to be delivered to the proper thyristor so that said output pulse is permitted as soon after the cessation of the preceding output current pulse following a safe period for the device to regain its blocking ability, as indicated by $t_o$. FIG. 5 illustrates this effect.

Thus in normal continuous operation of the converter, the pulses are directed to the gate of the switch connected to the appropriate input phase of the proper polarity at the normal time with respect to the output voltage zero cross-over instant or as soon thereafter as permitted by the safe period provided following the cessation of the preceding current pulse.

If a transient occurs and for any reason the time period of the output current is extended with respect to the output voltage half period jeopardizing the continued safe operation of the converter, the comparator portion 46 of the control automatically delays the pulse until a safe time interval has elapsed. The delaying action of the pulse continues until normal steady state operation is resumed.

To initiate the operation of the converter, a single pulse is injected into the voltage logic circuit 40 at terminal 71. This causes a firing pulse to be delivered to the appropriate switch and the first output current pulse flows. Subsequent voltage pulses are generated by the voltage logic based on the output voltage zero cross-over instant and in this manner the converter is able to follow changes in the resonant frequency of the load circuit.

Under certain load conditions, we have found it desirable to avoid transients and to assure smooth start-up to control the timing of the initial starting pulse with respect to the input voltage wave and various means for achieving said initial pulse may be employed as by a switch 70 which when in closed position takes a starting pulse from the envelope logic 40. We have found a preferred setting for said initial starting pulse is within 0° to 60° range in the first half cycle of said wave.

It is often desirable to adjust the power delivered to the load, i.e. after a melt has been completed, the power is reduced to a holding level until the metal is poured off. This can be accomplished in discrete steps by adjusting the ratio of the output transformer 38, as by taps 39, etc. It is likewise desirable to make a smooth and continuous adjustment of the output power, i.e. to maintain a specific metal temperature. This can be accomplished by adjustment of the phase or time relationship between the envelope and supply voltage. As shown in FIG. 8, the envelope has been timed to provide maximum power and the output current and the portion of that current flowing in phase A as illustrated. As the envelope is shifted, the effective value of voltage delivered to thyristors 10 and 16 is reduced and the output power will similarly be reduced. FIG. 9 illustrates this effect. Obviously, in order to maintain a balance between the three-phase supply lines, the envelopes must be shifted an equal amount.

We have discovered that smooth transient free operation of our converter is considerably enhanced by shifting the envelope forward as shown in FIG. 9 with respect to the input voltage wave. A typical curve of the relationship between power and the forward shift from the maximum power point is shown in FIG. 6a.

Figure 6A:
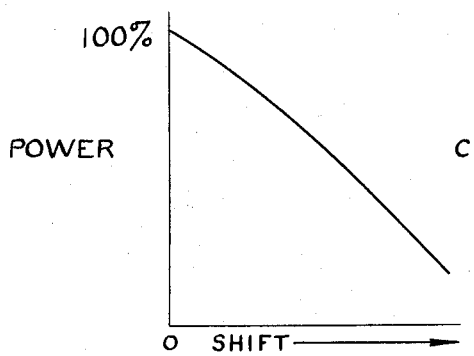
FIG. 6a, 6b and 6c is a diagrammatic sketch showing the effect of the envelope phase shift on output power, output current, and output voltage, respectively.

It is possible to regulate the power at a fixed point other than maximum available by sensing the load voltage on the secondary side of the transformer 38 and obtaining a current signal from a current transformer 61, comparing the said output power to a desired operating level, indicated by an operator adjustable potentiometer as shown at 60, and signalling by means 62 connected to envelope logic 40 by a line 63 to adjust the phase of 64–69 of the envelope logic 40 in accordance with the curve shown in FIG. 6a to maintain constant power output within the limits described.

Figure 6B:
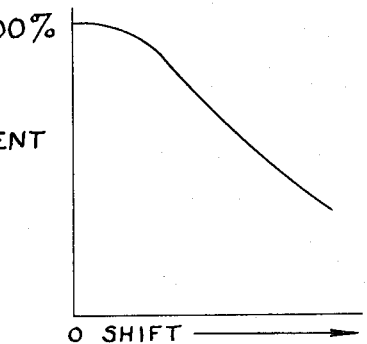
Figure 6C:
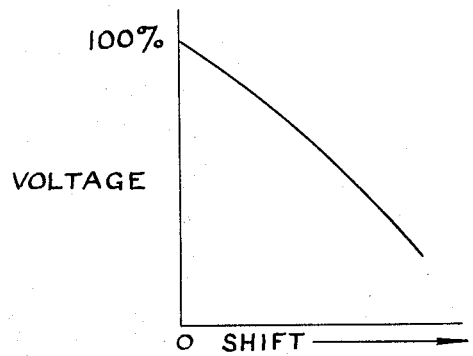

The relationship between phase shift and output current and phase shift and output voltage are shown in FIGS. 6b and 6c. The control can be adapted to provide limit protection for load voltage and output current. A signal proportional to the load voltage can be used as an input to a voltage limit circuit, not herein illustrated. If the RMS voltage delivered to the load exceeds a safe predetermined limit, the envelope is shifted to reduce the load voltage as shown in FIG. 6c. Similarly, a signal proportional to the output current can be used as an input to a current limit circuit, not herein illustrated. If the RMS current delivered to the load exceeds a safe predetermined limit, the envelope is shifted to reduce the output current as shown in FIG. 6b.

Figure 7A:
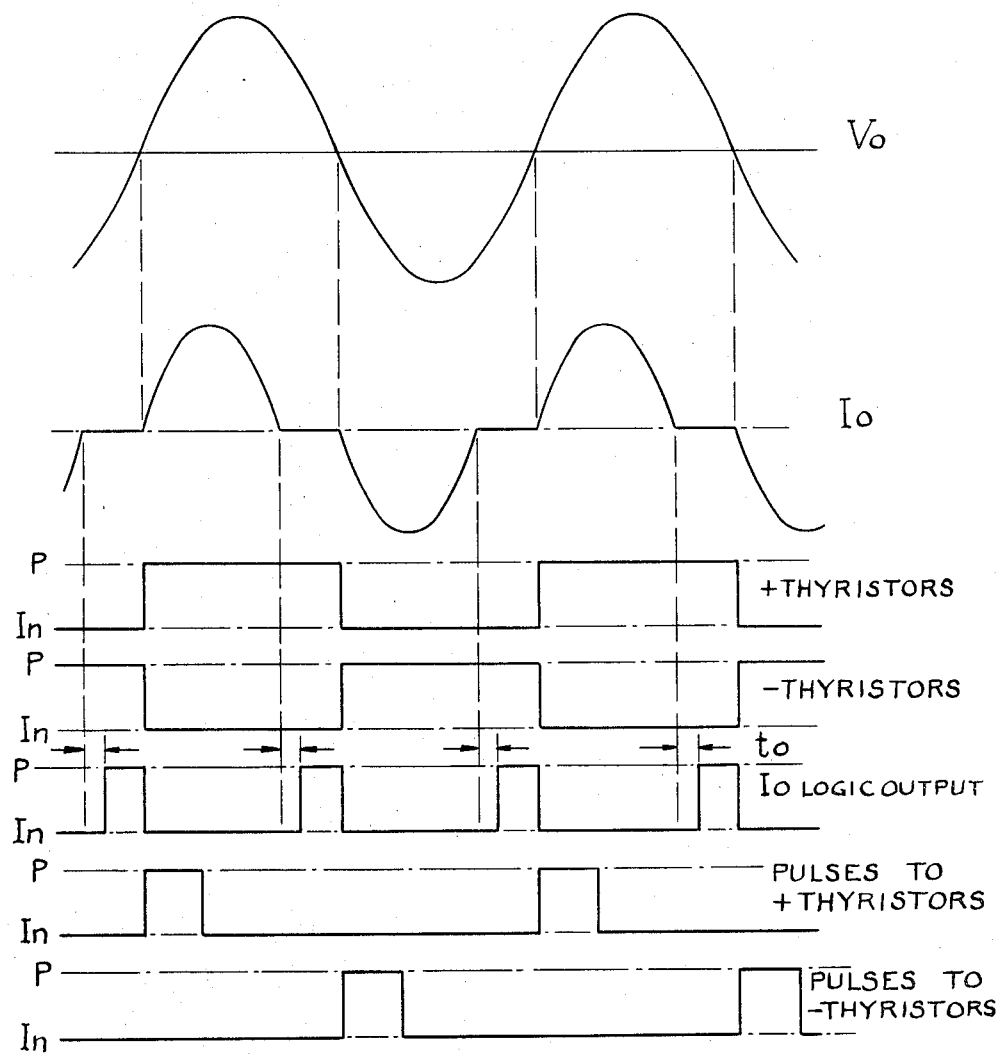
FIG. 7a illustrates the relationship between the single-phase output voltage and current of the converter and timing of the gating pulses of the positive and negative thyristors.

Under dynamic operating conditions, as stated hereinbefore, various transient conditions caused by sudden load change, change in the intended power level, line voltage surges, it is essential to adjust the operating frequency, the timing of the pulses with respect to the output voltage, and the envelope with respect to the incoming voltage in response to changes in the load or process requirements. These can best be illustrated by assuming the converter to be operating satisfactorily at maximum power with adequate thyristor turn-off time. The outputs of the logic and the thyristor gate drive circuit for this condition are illustrated in FIG. 7a.

Figure 7B:
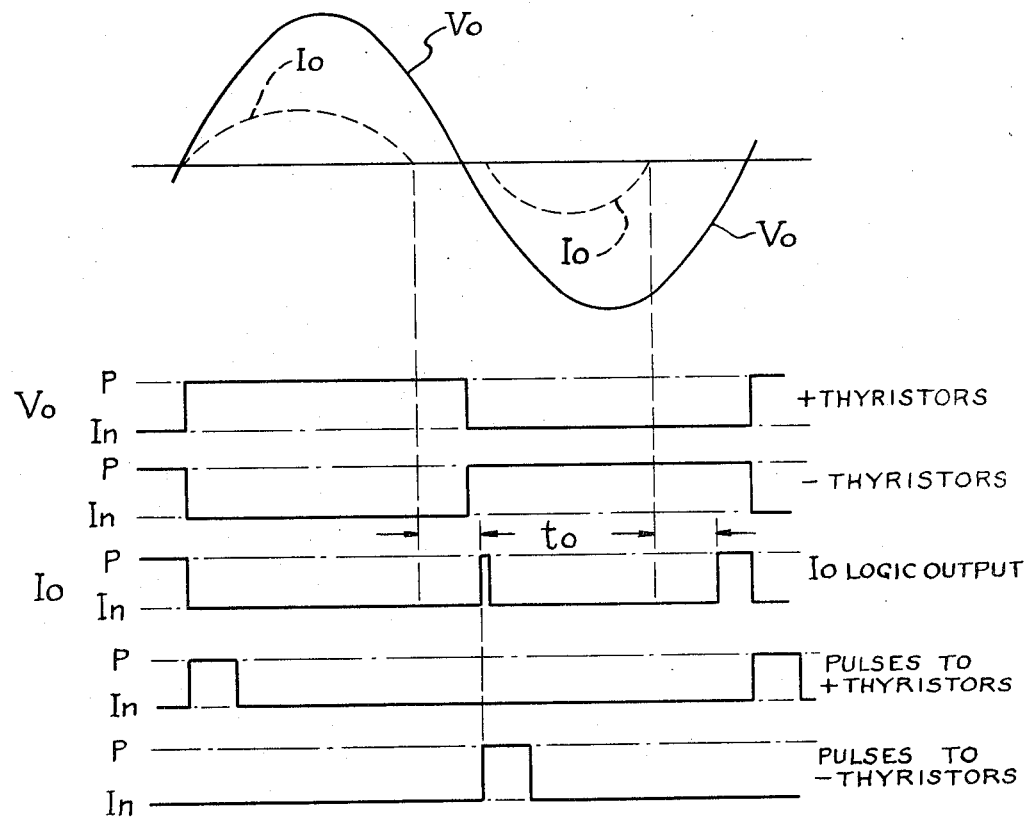
FIG. 7b illustrates the relationship between the single-phase output voltage and positive output current of extended duration and the timing of the output gating pulses with relation thereto.

As the resonant frequency of the load changes, the feedback from the load through the voltage logic products output pulses at the appropriate frequency. If any transient described in the hereinbefore described circuit result in insufficient turnoff time, the pulses are delayed by the comparison circuitry until a safe time has elapsed, see FIG. 7b.

It will be understood that many changes in the details of the invention as herein described and illustrated may be made without, however, departing from the spirit thereof or the scope of the appended claims.

What I claim is:

1. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiating of firing pulses for the said solid state switching devices during steady state conditions and to automatically modify said time relationship under transient conditions which results in substantial lengthening of an output current pulse so as to obtain a safe interval between the cessation of said lengthened output current pulse and the initiation of the subsequent firing pulse.

2. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a fixed time relationship between initiation of each firing pulse for said solid state switching devices and the corresponding output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse.

3. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide initiation of firing pulses for said solid state switching devices substantially at each output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse.

4. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiating of firing pulses for the said solid state switching devices during steady state conditions and to automatically modify said time relationship under transient conditions which results in substantial lengthening of an output current pulse so as to obtain a safe interval between the cessation of said lengthened output current pulse and the initiation of the subsequent firing pulse, wherein said control means include sensing means for sensing the instantaneous value of the input voltage, means for initiating a starting pulse directing said pulse to an appropriate solid state switching device at a predetermined phase angle with respect to line to neutral voltage zero-over instant.

5. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a fixed time relationship between initiation of each firing pulse for said solid state switching devices and the corresponding output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, wherein said control means include sensing means for sensing the instantaneous value of the input voltage, means for initiating a starting pulse directing said pulse to an appropriate solid state switching device at a predetermined phase angle with respect to line to neutral voltage zero cross-over instant.

6. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide initiation of firing pulses for said solid state switching devices substantially at each output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, wherein said control means include sensing means for sensing the instantaneous value of the input voltage, means for initiating a starting pulse directing said pulse to an appropriate solid state switching device at a predetermined phase angle with respect to line to neutral voltage cross-over instant.

7. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiating of firing pulses for the said solid state switching devices during steady state conditions and to automatically modify said time relationship under transient conditions which results in substantial lengthening of an output current pulse so as to obtain a safe interval between the cessation of said lengthened output current pulse and the initiation of the subsequent firing pulse, said control means including sensing means for sensing the instantaneous value of the input voltage, means for initiating a starting pulse directing said pulse to an appropriate solid state switching device at a predetermined phase angle with respect to line to neutral voltage zero cross-over instant and said control means initiating said starting pulse initiate said pulse within a 0° to 60° range in the first half cycle of the input voltage wave.

8. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiation of each firing pulse for said solid state switching devices and the corresponding output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, said control means including sensing means for sensing the instantaneous value of the input voltage, means for initiating a starting pulse directing said pulse to an appropriate solid state switching device at a predetermined phase angle with respect to line to neutral voltage zero cross-over instant and said control means initiating said starting pulse initiate said pulse within a 0° to 60° range in the first half cycle of the input voltage wave.

9. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide initiation of firing pulses for said solid state switching devices substantially at each output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, said control means including sensing means for sensing the instantaneous value of the input voltage, means for initiating a starting pulse directing said pulse to an appropriate solid state switching device at a predetermined phase angle with respect to line to neutral voltage zero cross-over instant and said control means initiating said starting pulse initiate said pulse within a 0° to 60° range in the first half cycle of the input voltage wave.

10. Control means for an AC to AC frequency converter as claimed in claim 1, wherein said control means include sensing means for sensing the instantaneous value of the line to neutral supply voltage and producing substantially equal envelopes controlling the time period during which each solid state switching device conducts output current, and means whereby the time relationship of said envelopes to said line to neutral supply voltage is shifted to provide control of output power.

11. Control means for an AC to AC frequency converter as claimed in claim 2, wherein said control means include sensing means for sensing the instantaneous value of the line to neutral supply voltage and producing substantially equal envelopes controlling the time period during which each solid state switching device conducts output current, and means whereby the time relationship of said envelopes to said line to neutral supply voltage is shifted to provide control of output power.

12. Control means for an AC to AC frequency converter as claimed in claim 3, wherein said control means include sensing means for sensing the instantaneous value of the line to neutral supply voltage and producing substantially equal envelopes controlling the time period during which each solid state switching device conducts output current, and means whereby the time relationship of said envelopes to said line to neutral supply voltage is shifted to provide control of output power.

13. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiating of firing pulses for the said solid state switching devices during steady state conditions and to automatically modify said time relationship under transient conditions which results in substantial lengthening of an output current pulse so as to obtain a safe interval between the cessation of the subsequent firing pulse, wherein said control means also include sensing means for sensing the instantaneous value of the line to neutral supply voltage and producing substantially equal envelopes controlling the time period during which each solid state switching device conducts, and means whereby the time relationship of said envelopes and said line to neutral supply voltage is modified by shifting said envelopes ahead in time to reduce output power.

14. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a fixed time relationship between initiation of each firing pulse for said solid state switching devices and the corresponding output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, wherein said control means also include sensing means for sensing the instantaneous value of the line to neutral supply voltage and producing substantially equal envelopes controlling the time period during which each solid state switching device conducts, and means whereby the time relationship of said envelopes and said line to neutral supply voltage is modified by shifting said envelopes ahead in time to reduce output power.

15. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide initiation of firing pulses for said solid state switching devices substantially at each output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, wherein said control means also include sensing means for sensing the instantaneous value of the line to neutral supply voltage and producing substantially equal envelopes controlling the time period during which each solid state switching device conducts, and means whereby the time relationship of said envelopes and said line to neutral supply voltage is modified by shifting said envelopes ahead in time to reduce output power.

16. Control means for an AC to AC frequency converter as claimed in claim 13, wherein the power is regulated by sensing of the output voltage and output current and adjusting the phase of the envelope logic.

17. Control means for an AC to AC frequency converter as claimed in claim 14, wherein the power is regulated by sensing of the output voltage and output current and adjusting the phase of the envelope logic.

18. Control means for an AC to AC frequency converter as claimed in claim 15, wherein the power is regulated by sensing of the output voltage and output current and adjusting the phase of the envelope logic.

19. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiating of firing pulses for the said solid state switching devices during steady state conditions and to automatically modify said time relationship under transient conditions which results in substantial lengthening of an output current pulse so as to obtain a safe interval between the cessation of said lengthened output current pulse and the initiation of the subsequent firing pulse, said sensing means are provided to sense instantaneous line to neutral supply voltage and power control is obtained by shifting the time relationship between the envelope and the line to neutral supply voltage and the envelope is shifted forward with respect to the input voltage wave, wherein said control includes a signal proportional to the output voltage providing an input to a voltage limit circuit which shifts the envelope forward with respect to the line to neutral supply voltage.

20. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a fixed time relationship between initiation of each firing pulse for said solid state switching devices and the corresponding output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, said sensing means are provided to sense instantaneous line to neutral supply voltage and power control is obtained by shifting the time relationship between the envelope and the line to neutral supply voltage and the envelope is shifted forward with respect to the input voltage wave, wherein said control includes a signal proportional to the output voltage providing an input to a voltage limit circuit which shifts the envelope forward with respect to the line to neutral supply voltage.

21. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide initiation of firing pulses for said solid state switching devices substantially at each output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, said sensing means are provided to sense instantaneous line to neutral supply voltage and power control is obtained by shifting the time relationship between the envelope and the line to neutral supply voltage and the envelope is shifted forward with respect to the input voltage wave, wherein said control includes a signal proportional to the output voltage providing an input to a voltage limit circuit which shifts the envelope forward with respect to the line to neutral supply voltage.

22. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a substantially fixed time relationship between initiating of firing pulses for the solid state switching devices during steady state conditions and to automatically modify said time relationship under transient conditions which results in substantial lengthening of an output current pulse so as to obtain a safe interval between the cessation of said lengthened output current pulse and the initiation of the subsequent firing pulse, said sensing means are provided to sense instantaneous line to neutral supply voltage and power control is obtained by shifting the time relationship between the envelope and the line to neutral supply voltage and the envelope is shifted forward with respect to the input voltage wave, wherein said control means includes a signal proportional to the output current and provides an input to a current limit circuit which shifts the envelope forward with respect to the line to neutral supply voltage.

23. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide a fixed time relationship between initiation of each firing pulse for said solid state switching devices and the corresponding output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, said sensing means are provided to sense instantaneous line to neutral supply voltage and power control is obtained by shifting the time relationship between the envelope and the line to neutral supply voltage and the envelope is shifted forward with respect to the input voltage wave, wherein said control means includes a signal proportional to the output current and provides an input to a current limit circuit which shifts the envelope forward with respect to the line to neutral supply voltage.

24. Control means for an AC to AC frequency converter utilizing solid state switching devices connected to a polyphase lower frequency source to provide single phase power at a higher frequency to a load comprising an induction heating coil and parallel capacitance, said control means including sensing means for sensing the instantaneous values of the output voltage and output current, and means for combining signals derived from said sensing means to provide initiation of firing pulses for said solid state switching devices substantially at each output voltage zero cross-over instant during steady state conditions and to automatically modify said time relationship under transient conditions which results in substantial lengthening of an output current pulse, so as to obtain a safe interval between the cessation of said lengthened output current pulse and the initiation of the subsequent firing pulse, said sensing means are provided to sense instantaneous line to neutral supply voltage and power control is obtained by shifting the time relationship between the envelope and the line to neutral supply voltage and the envelope is shifted forward with respect to the input voltage wave, wherein said control means includes a signal proportional to the output current and provides an input to a current limit circuit which shifts the envelope forward with respect to the line to neutral supply voltage.

* * * * *